US012702875B2

United States Patent

(12) United States Patent
Thayer et al.

(10) Patent No.: US 12,702,875 B2
(45) Date of Patent: Aug. 11, 2026

(54) FALL PROTECTION APPARATUS, SYSTEM AND METHOD

(71) Applicant: Edge AI Solutions Inc., Pittsburgh, PA (US)

(72) Inventors: Scott Thayer, Pittsburgh, PA (US); Allan DuBeau, Pittsburgh, PA (US); Brandon Ingram, Pittsburgh, PA (US)

(73) Assignee: Edge AI Solutions Inc., Pittsburgh, PA (US)

( * ) Notice: Subject to any disclaimer, the term of this patent is extended or adjusted under 35 U.S.C. 154(b) by 593 days.

(21) Appl. No.: 18/315,640

(22) Filed: May 11, 2023

(65) Prior Publication Data

US 2023/0364452 A1 Nov. 16, 2023

Related U.S. Application Data

(60) Provisional application No. 63/364,534, filed on May 11, 2022.

(51) Int. Cl.
*A62B 35/00* (2006.01)

(52) U.S. Cl.
CPC ...... *A62B 35/0018* (2013.01); *A62B 35/0025* (2013.01); *A62B 35/0037* (2013.01)

(58) Field of Classification Search
CPC ............ A62B 35/0018; A62B 35/0025; A62B 35/0037
See application file for complete search history.

(56) References Cited

U.S. PATENT DOCUMENTS

2018/0233018 A1* 8/2018 Burwinkel ........... A61B 5/0002
2020/0222732 A1* 7/2020 Rutkowski ......... A62B 35/0025
2021/0016115 A1* 1/2021 Bhaskarwar ....... A62B 35/0025
2021/0372561 A1* 12/2021 Swift ................. A41D 13/0002

* cited by examiner

*Primary Examiner* — Michael W Choi
(74) *Attorney, Agent, or Firm* — K&L Gates LLP

(57) ABSTRACT

A fall protection apparatus is disclosed herein. The fall protection apparatus can include a sensing device, an alert generating device, a processing circuit communicably coupled to the sensing device and the alert generating device, and a memory communicably coupled to the processing circuit. The memory can store a fall-detection intelligence algorithm that, when executed by the processing circuit, causes the processing circuit to receive a signal from the sensing device, determine a parameter associated with a potential fall based on the signal, determine the parameter exceeds a user-defined threshold based on the parameter, and cause the alert generating device to generate an alert based on the determination that the parameter exceeds the user-defined threshold.

20 Claims, 11 Drawing Sheets

FALL PROTECTION APPARATUS, SYSTEM AND METHOD

CROSS-REFERENCE TO RELATED APPLICATIONS

The present application is related to U.S. Provisional Patent Application No. 63/364,534, titled FALL PROTECTION APPARATUS, SYSTEM, AND METHOD, filed May 11, 2022, the disclosure of which is incorporated by reference in its entirety herein.

SUMMARY

In one aspect, the present disclosure provides a fall protection apparatus. The fall protection apparatus can include a sensing device, an alert generating device, a processing circuit communicably coupled to the sensing device and the alert generating device, and a memory communicably coupled to the processing circuit. The memory can store a fall-detection intelligence algorithm that, when executed by the processing circuit, causes the processing circuit to receive a signal from the sensing device, determine a parameter associated with a potential fall based on the signal, determine the parameter exceeds a user-defined threshold based on the parameter, and cause the alert generating device to generate an alert based on the determination that the parameter exceeds the user-defined threshold.

In another aspect, the present disclosure provides a fall protection apparatus, including a processing circuit communicably coupled to a sensing device and an alert generating device, and a memory communicably coupled to the processing circuit. The memory is to store a fall-detection intelligence algorithm that, when executed by the processing circuit, causes the processing circuit to receive a signal from the sensing device, determine a parameter associated with a potential fall based on the signal, determine the parameter exceeds a user-defined threshold based on the parameter, and cause the alert generating device to generate an alert based on the determination that the parameter exceeds the user-defined threshold.

In still another aspect, a computer-implemented method of mitigating a risk of a potential fall is disclosed. The method can include receiving, via a processing circuit, a first signal from a first sensing device, determining, via the processing circuit, an altitude of a user of a fall protection apparatus based on the first signal, receiving, via a processing circuit, a second signal from a second sensing device, determining, via the processing circuit, a state of a connection between a connector and a secure anchor location based on the second signal, determining, via the processing circuit, the parameter exceeds a user-defined threshold based on the altitude of the user of the fall protection apparatus and the state of the connection between a connector and a secure anchor location, and causing, via the processing circuit, an alert generating device to generate an alert based on the determination that the parameter exceeds the user-defined threshold.

BACKGROUND

This application discloses an invention which is related, generally and in various aspects, to a fall protection apparatus, a system including the same, and a method of mitigating risk of a fall.

The U.S. Bureau of Labor Statistics estimates, using data published in 2014, that over 260,000 workers suffered falls to either the same building level or lower, and almost 800 of those workers died from such falls. The highest rate of fall-related deaths occurred in the construction industry. In 2018, there were a total of 1008 fatalities in the construction industry, and 320 of these were caused by falls to a lower level. Each of these fatalities has been classified as preventable. For a given year, the number of workers who experience non-fatal falls are much, much higher. It has been estimated that approximately $70 billion of costs (e.g., workers' compensation, medical costs, etc.) have been incurred in the United States as a result of injuries associated with worker falls.

FIG. 1 illustrates four basic components of a fall arrest system. The four basic components, also known as ABCD, include anchorage, body support, connectors and descent/rescue. The first component, A/anchorage, refers to a secure point of attachment for the fall arrest system. Examples of secure points of attachment include a beam, a cross-arm strap and a choker. The second component, B/body support, refers to a full body harness worn by a worker and provides a connection point on a worker for the fall arrest system. The full body harness typically includes straps which go around the legs, chest and shoulders of the worker, as well as a back attachment area which includes a dorsal D-ring for securing a connector to the full body harness. It is also known for some full body harnesses to further include a sternal D-ring and/or side/hip D-rings for additional connection points. The third component, C/connectors refers to devices used to connect the full body harness to the anchorage system. The connectors typically include a lanyard or a self-retracting lifeline with snap hooks or other devices secured to the ends of the lanyards in order to connect the lanyard to the dorsal D-ring of the full body harness and a secure anchor point. As one end of the lanyard connects to the dorsal D-ring of the full body harness, such lanyards are known as D-ring connectors. The fourth component, D/descent/rescue refers to the rescue and retrieval of a fallen worker.

FIG. 2 illustrates an example of a fall arrest system. The fall arrest system includes a full body harness and a lanyard with a snap hook for connecting to a secure anchor point. The dorsal D-ring of the full body harness and the connection device of the lanyard attached to the dorsal D-ring are both hidden from view in FIG. 2. FIG. 3 illustrates an example of a steel beam being utilized as a secure point of attachment for a fall arrest system. As shown in FIG. 3, the steel beam is positioned above the worker. FIG. 4 illustrates an example of two snap hooks of a fall arrest system being utilized for manual ascent of a ladder.

In the United States, the Occupational Safety and Health Administration (OSHA) recommends a three-pronged approach to shielding workers from the unnecessary and preventable death and injuries resulting from worker falls. The three-prongs/steps are (1) planning ahead, (2) providing proper equipment and (3) training. With regard to planning ahead, when employees are working from heights, employers should plan to ensure the job is done safely. With regard to providing proper equipment, when workers are exposed to risks of falling to lower levels which are six feet or more away, the law requires employers to provide fall protection. With regard to training, every worker who uses fall protection equipment should be trained on the proper setup and use of this life saving equipment.

OSHA reasons that if these three steps are executed each time as intended, the risk of death or serious injury resulting from these types of falls can be significantly reduced.

However, a large percentage of deaths and injuries are experienced by workers who are: (1) actively wearing fall protection equipment, (2) have been required to use fall protection equipment on the job, and (3) have been properly trained on the use of this equipment. Despite rigorous planning, the use of state-of-the-art equipment, and quality training, these deaths and injuries continue to occur. Thus, although executing the three steps is a good start to mitigating the risk of death or serious injury, the execution of these steps alone is not sufficient.

One cause for the continuing death and injuries is various human failings, often resulting in the worker either not utilizing the provided safety equipment or not utilizing it properly, even when the use of such is mandated. However, there is a certain level of carelessness exhibited on many construction sites, particularly in the United States. This lack of care can be easily recognized by finding workers who are outfitted with perfectly good fall protection equipment (e.g., full body harness and lanyard), but the full body harness isn't properly connected to an anchorage point which will mitigate falls to lower levels. After all the effort expended by both workers and employers, many of the deaths and injuries could have been avoided, for example, by simply properly attaching a lanyard (which is connected to a D-ring of the full harness) to a secure anchor location on a work structure.

In the construction industry, this phenomenon of failing to use or improperly using fall arrest equipment is mostly associated with the operation of scissor lifts, boom lifts, and vertical mast lifts and other applications where fall risk is present. These types of lift equipment are configured to move workers closer to an elevated position. FIG. 5 illustrates an example of an aerial lift. FIG. 6 illustrates an example of a truck outfitted with a lift in a boom and basket configuration. In the cases of such lifts, the lift basket and the lift boom motion can expose an untethered worker in lift basket (e.g., a lift passenger) to serious risk of injury or death due to a fall. Some of the most common and easiest deaths or injuries to prevent in the construction industry are those associated with failure to properly use required fall arrest equipment during operation of aerial lifts and other basket and boom personnel lifting devices. According to OSHA, 85% of all aerial lift accidents occur during operation of the lift. The breakdown of accidents is roughly as follows: electrocution (30%), falls due to tip-overs (23%), falls from platforms (20%), or hit/crushed by the lift (12%). The remaining 15% is comprised of accident causes related to lift maintenance (10%), and injuries when climbing on or off the lift (5%).

To mitigate worker falls associated with aerial lifts and other boom and basket lift devices, and the deaths and injuries caused by such falls, it is imperative that the full body harness worn by the lift passenger/worker be properly connected to a secure anchor point. Unfortunately, known fall arrest systems fail to provide a warning to a worker engaged in an activity where a fall risk to a lower level is present (e.g., a worker standing in a boom lift where the D-ring connector of the full body harness is not properly connected to a secure anchor location), fail to detect worker falls, fail to determine the severity of the fall, fail to summon assistance and/or emergency services, and/or fail to capture conditions/parameters which led to the fall.

BRIEF DESCRIPTION OF THE DRAWINGS

The novel features of aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
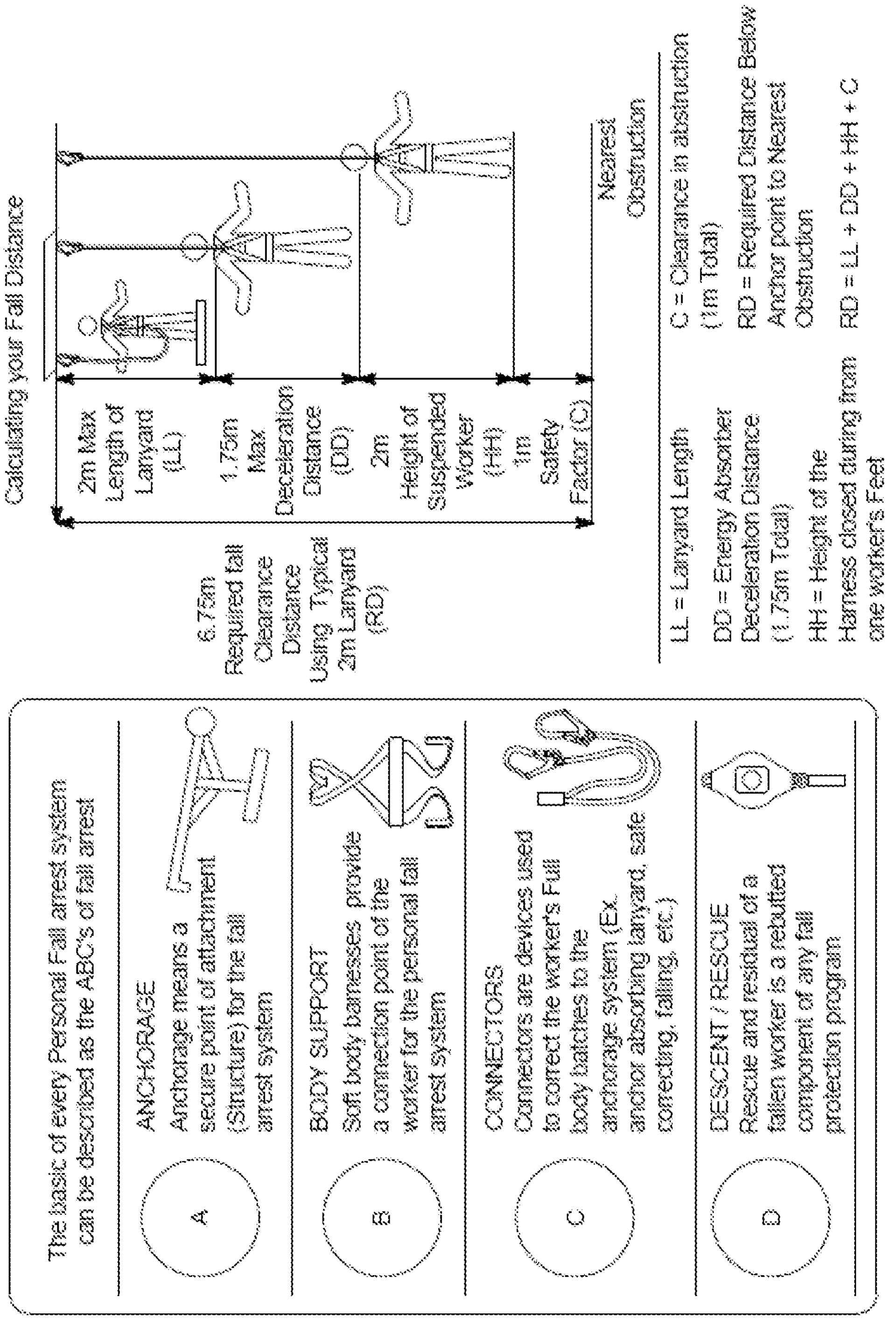
FIG. 1 illustrates four basic components of a fall arrest system.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description reference is made to the accompanying drawings. In the drawings, similar symbols and reference characters typically identify similar components throughout several views, unless context dictates otherwise. The illustrative aspects described in the detailed description, drawings, and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the fall protection apparatus, system and method, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the fall protection apparatus, system and method disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Aspects of the described invention may be implemented by a computing device and/or a computer program/software/algorithm stored on a computer-readable medium. The computer-readable medium may comprise a disk, a device, and/or a propagated signal.

Figure 2:
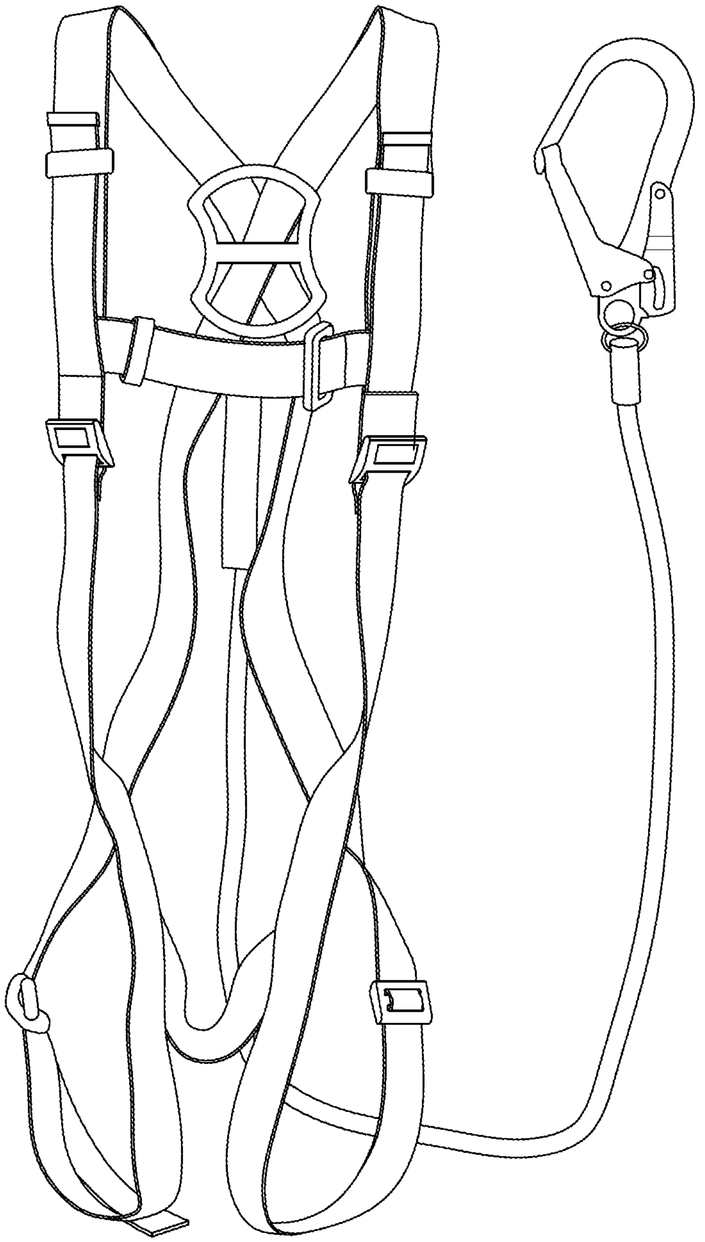
FIG. 2 illustrates an example of a fall arrest system.
Figure 3:
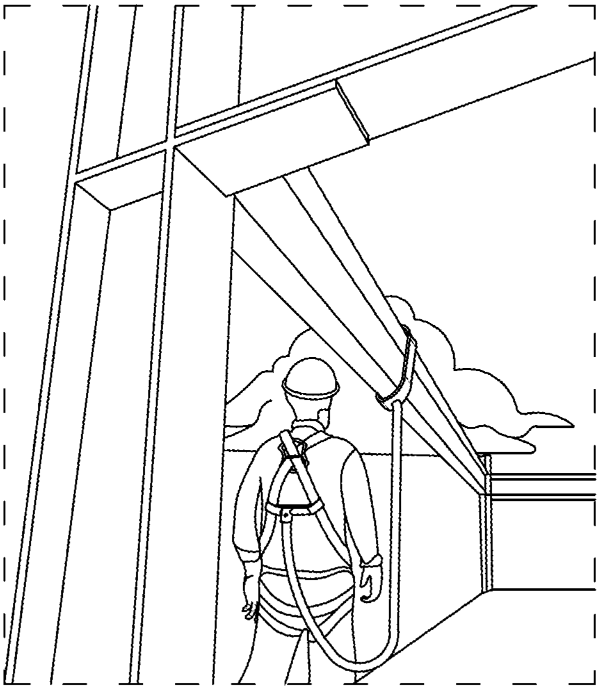
FIG. 3 illustrates an example of a steel beam being utilized as a secure point of attachment for a fall arrest system.
Figure 4:
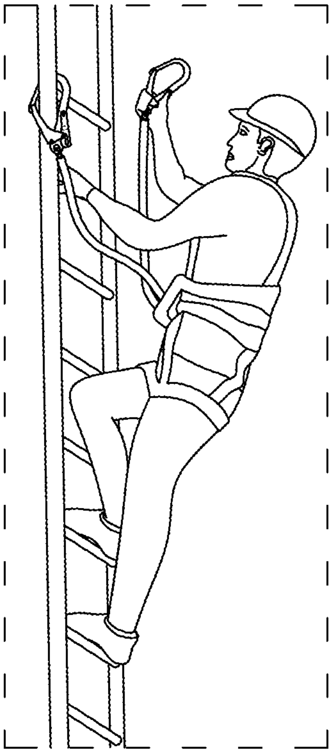
FIG. 4 illustrates an example of two snap hooks of a fall arrest system being utilized for manual ascent of a ladder.
Figure 6:
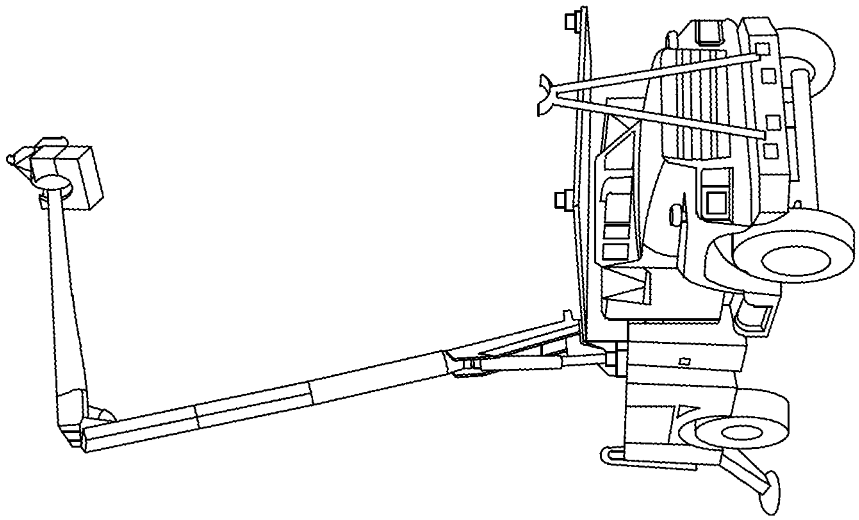
FIG. 6 illustrates an example of a truck outfitted with a lift in a boom and basket configuration.
Figure 5:
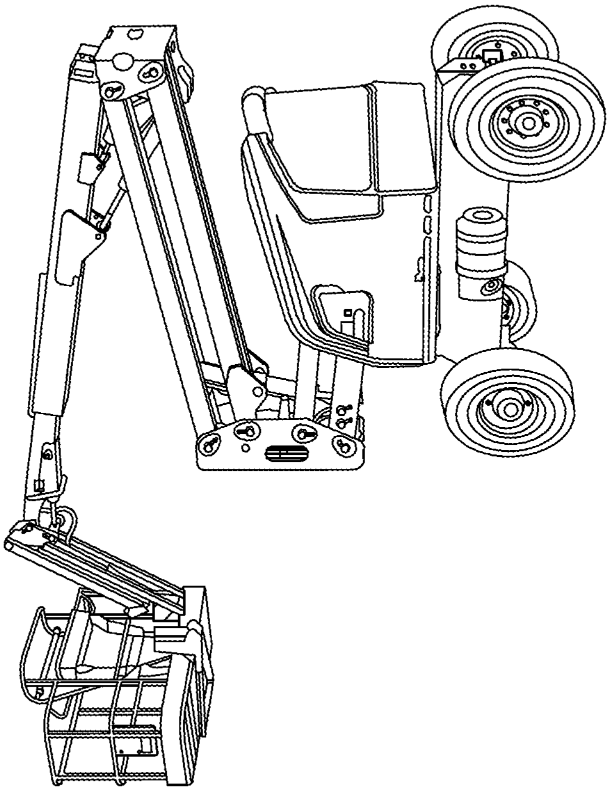
FIG. 5 illustrates an example of an aerial lift.
Figure 7:
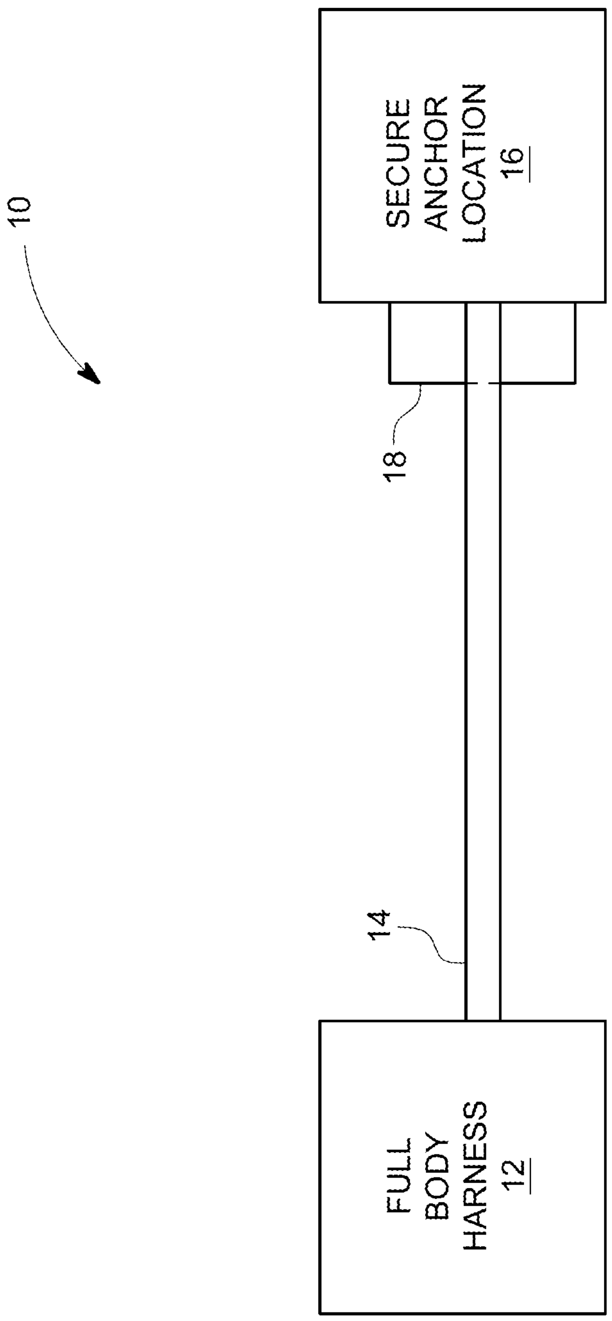
FIG. 7 illustrates a fall protection system, in accordance with at least one aspect of the present disclosure.

FIG. 7 illustrates a fall protection system 10, in accordance with at least one aspect of the present disclosure. The fall protection system 10 includes a full body harness 12 (to be worn by a worker), a lanyard 14 for connecting the full body harness 12 to a secure anchor location 16, and a fall protection apparatus 18. The full body harness 12 may be similar or identical to the full body harness described hereinabove with respect to, for example, FIGS. 1 and 2. Additionally, although the full body harness 12 is described as having a dorsal D-ring, it will be appreciated that the dorsal ring may be any suitable shape of ring suitable for being connected to a snap hook or other connecting device of the lanyard 14. For example, according to various aspects, the dorsal ring may be circular-shaped, the dorsal ring may be a metal plate with a circular shaped opening, etc. The lanyard 14 may be similar or identical to the lanyard/D-ring connector described hereinabove with respect to, for example, FIGS. 1, 2 and 4. Similarly, the secure anchor location 16 may be similar or identical to the secure point of attachment described hereinabove with respect to, for example, FIGS. 1 and 3.

The fall protection apparatus 18 is configured to be securely attached to/connected to/affixed to the lanyard/D-ring connector 14 and may be attached/connected/affixed to the end of the lanyard/D-ring connector 14 proximate to the secure anchor location 16. For example, according to various aspects, the lanyard/D-ring connector 14 may pass through a portion of the fall protection apparatus 18. Although the fall protection system 10 may be utilized in any number of different workplace environments (e.g., building still having structural steel being set, working on a ladder, working from the basket of an aerial lift, etc.), the fall protection system 10 will be described herein in the context of its use with boom and basket type lift equipment.

Figure 8:
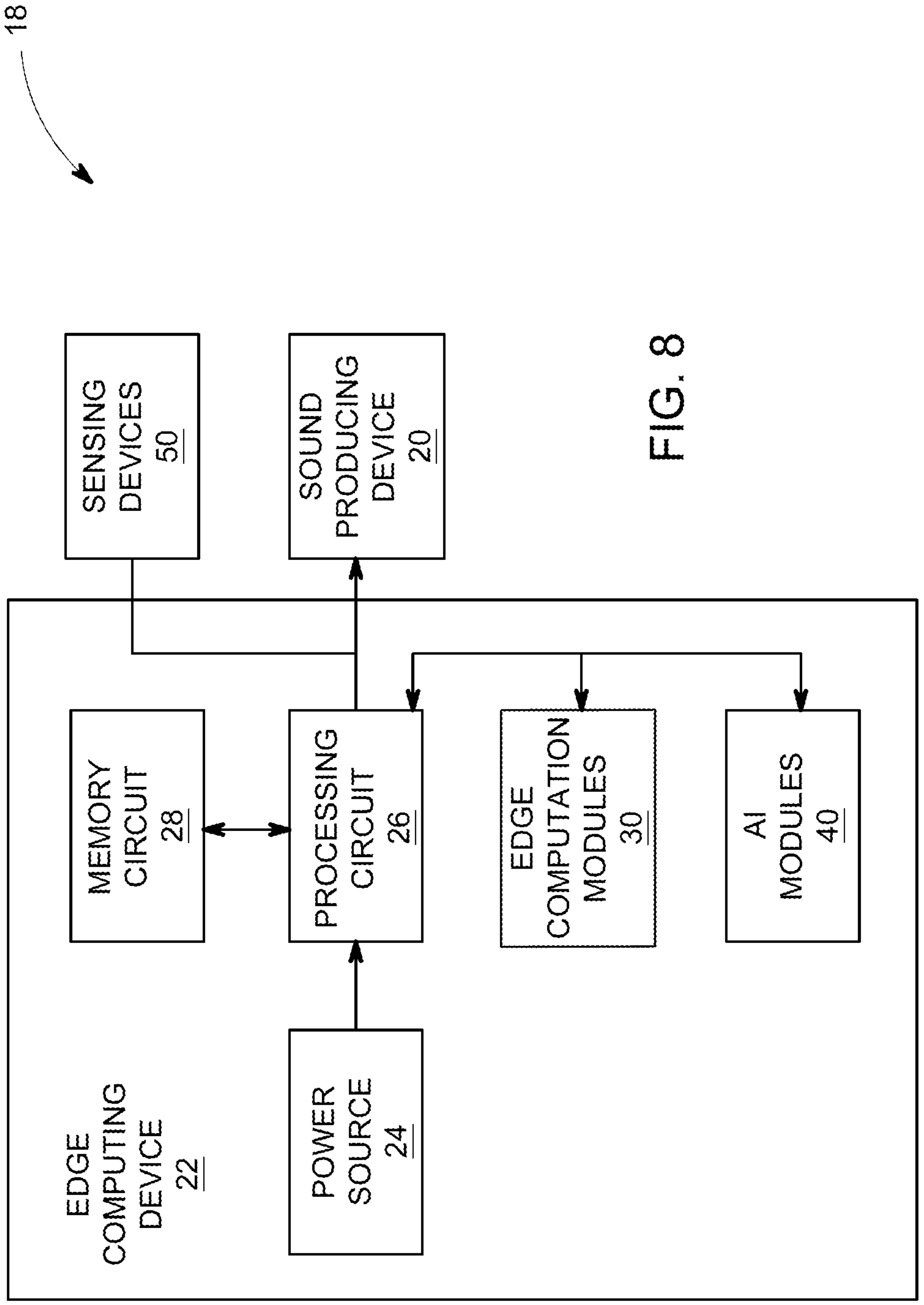
FIG. 8 illustrates a fall protection apparatus of the fall protection system of FIG. 7, in accordance with at least one aspect of the present disclosure.

FIG. 8 illustrates the fall protection apparatus 18, in accordance with at least one aspect of the present disclosure. The fall protection apparatus 18 is configured to ensure proper use of personal fall protection during aerial lift activities and other activities which have a significant risk of injury or death due to falls. The fall protection apparatus 18 includes an alert generating device 20, which according to the non-limiting aspect of FIG. 8, can include a sound producing device 20 (e.g., a speaker) but according to other non-limiting aspects, can include tactical device (e.g., a haptic sensor) or a visual sensor (e.g., a light, a screen). The fall protection apparatus 18 can further include an edge computing device 22 which includes a power source 24, a processing circuit 26, a memory circuit 28, an edge computation module 30 and an artificial intelligence (AI) module 40. The fall protection apparatus 18 also includes a sensing device 50 configured to generate signals associated with parameters of a potential fall. As will be explained in further detail herein, the sensing device 50 can include an inertial sensing device, a gyroscope, a microbolometer, or an imaging device, or combinations thereof. For example, according to some non-limiting aspects, the sensing device 50 can include a microbolometer configured to generate signals associated with parameters such as an altitude of a user of the fall protection apparatus 18. According to other non-limiting aspects, the sensing device 50 can include an inertial measurement unit or a gyroscope configured to generate signals associated with parameters such as a state of a connector connecting the lanyard and harness to a secure anchor point (e.g., the sensing device 50 can detect a position of the connector relative to the harness or the secure anchor point). Upon receiving signals from the sensing device 50, the processing circuit 26, via a fall-protection algorithm stored in the memory circuit 28, can determined parameters associated with signals received from the sensing device 50. Based on those determined parameters, the processing circuit 26 can determine whether a parameter exceeds a user-defined threshold based on the parameter. For example, the processing circuit 26 may determine a user of the fall protection apparatus exceeds a user-defined altitude and thus, is vulnerable to a fall. Alternately or additionally, the processing circuit 26 may determine that the connector is not oriented in compliance with a user-defined orientation (e.g., is not connected to the secure anchor point). Accordingly, the the processing circuit 26 may cause the alert generating device 20 to generate an alert (e.g., a sound, a vibration, a visual display) that cautions the user of the fall protection apparatus of the potential fall. Of course, according to other non-limiting aspects, other sensing devices 50 can be used to generate signals associated with other parameters, including an acceleration, a deceleration, a force, an angular rate of motion, or an orientation, a motion, or combinations thereof.

Although only one edge computation module 30, one AI module 40 and one sensing device 50 are shown in FIG. 8 for purposes of simplicity, it will be appreciated that the fall protection apparatus 18 may include any number of these components. For example, according to various aspects, the fall protection apparatus 18 includes a plurality of edge computation modules 30, a plurality of AI modules 40 and a plurality of sensing devices 50. Additional information regarding these components is set forth hereinbelow with respect to FIG. 9.

The power source 24 may be any suitable type of power source. According to various aspects, the power source 24 is an embedded power source such as, for example, one or more batteries. According to various aspects, the one or more batteries are rechargeable batteries. The processing circuit 26 is coupled to the power source 24 and may be, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The processing circuit 26 may, collectively or individually, be embodied as circuitry that forms part of a larger system, for example, an integrated circuit (IC), an application-specific integrated circuit (ASIC), a system on-chip (SoC), etc. Accordingly, the processing circuit 26 may include, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The memory circuit 28 is communicably coupled to the processing circuit 26 and may include more than one type of memory. For example, according to various aspects, the memory circuit 28 may include volatile memory and non-volatile memory. The volatile memory can include random access memory (RAM), which can act as external cache memory. According to various aspects, the random access memory can be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM), direct Rambus random access memory (DRRAM) and the like. The non-volatile memory can include read-only memory (ROM), programmable read-only memory (PROM), electrically programmable read-only memory, electrically erasable programmable read-only memory (EEPROM), flash memory and the like. According to various aspects, the memory circuit 26 can also include removable/non-removable, volatile/non-volatile storage media, such as for example disk storage. The disk storage can include, but is not limited to, devices like a magnetic disk drive, a floppy disk drive, a tape drive, a Jaz drive, a Zip drive, a LS-60 drive, a flash memory card, or a memory stick. In addition, the disk storage can include storage media separately or in combination with other storage media including, but not limited to, an optical disc drive such as a compact disc ROM device (CD-ROM), a compact disc recordable drive (CD-R Drive), a compact disc rewritable drive (CD-RW Drive), a digital versatile disc ROM drive (DVD-ROM) and the like.

Figure 9:
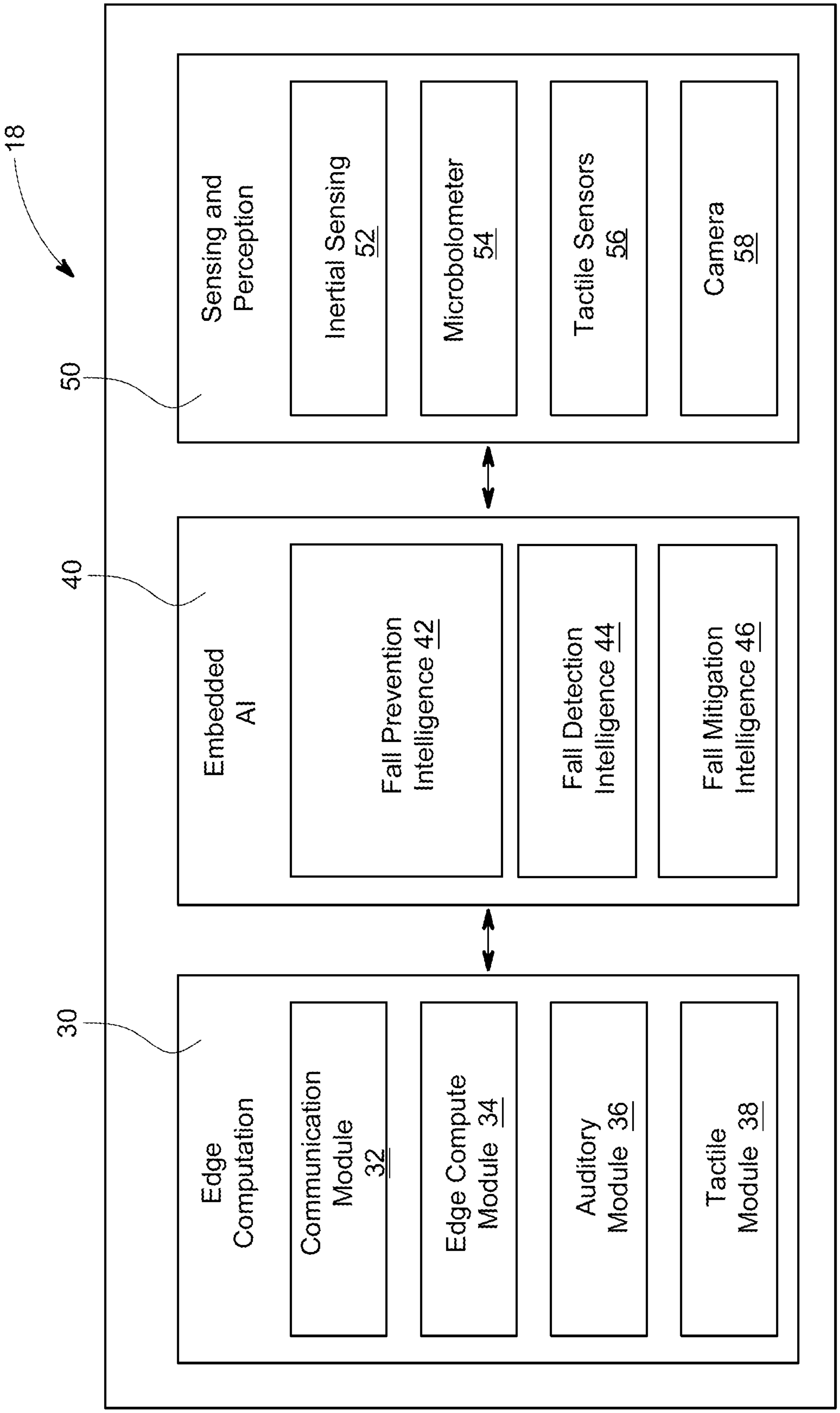
FIG. 9 illustrates a functional representation of the fall protection apparatus of FIG. 8, in accordance with at least one aspect of the present disclosure.

FIG. 9 illustrates a functional representation of the fall protection apparatus 18 of FIG. 8, in accordance with at least one aspect of the present disclosure. According to various aspects, the edge computation module 30 includes a plurality of edge computation modules which collectively include a wireless or cellular communication module 32, an edge compute module 34, an auditory module 36 and a tactile module 38.

The wireless or cellular communication module 32 is communicably coupled to the processing circuit 26 and is configured to allow for wireless communications between the fall protection apparatus 18 and an external device or system (not shown) via a network (not shown). The network may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network may include elements, such as, for example, intermediate nodes, proxy servers, routers, switches, and adapters configured to direct and/or deliver data. In general, the fall protection apparatus 18 is configured to communicate with one or more external devices or systems via the network using various communication protocols (e.g., HTTP, TCP/IP, TelNet, UDP, WAP, WebSockets, WiFi, Bluetooth) and/or to operate within or in concert with one or more other communications systems.

The wireless communication module 32 can employ any suitable wireless communication technology. For example, according to various aspects, the wireless communication module 32 can employ, Bluetooth, Z-Wave, Thread, ZigBee, and the like. Similarly, the wireless communication module 104 can employ any one of a number of wireless communication standards or protocols, including but not limited to Wi-Fi (IEEE 802.11 family), WPA2, WPA3, WiMAX (IEEE 802.16 family), IEEE 802.20, long-term evolution (LTE), and Ev-DO, HSPA+, HSDPA+, HSUPA+, EDGE, GSM, GPRS, CDMA, TDMA, DECT, and Ethernet derivatives thereof, as well as any other wireless protocols that are designated as 3G, 4G, 5G, and beyond.

The edge compute module 34 is communicably coupled to the processing circuit 26 and is configured to provide real-time processing of information, as well as provide basic analytics associated with such information. The information to be processed may originate from the any of the other edge computation modules (e.g., the wireless communication module 32, the auditory module 36 and/or the tactile module 38), from any of the plurality of AI modules and/or from any of the plurality of sensing devices.

The auditory module 36 is communicably coupled to the processing circuit 26 and is configured to energize the sound producing device 20 to provide an audible warning/alarm to a lift passenger who is attempting to conduct a work-related operation in an unsafe state. The audible warning/alarm alerts the worker and others in the area of the worker that the worker is at imminent risk of a fall. According to at least one aspect, such a warning/alarm may be at least 80 decibels, and may escalate and persist until the unsafe condition has been resolved.

The tactile module 38 is communicably coupled to the processing circuit 26 and is configured to provide a tactile warning to a lift passenger who is attempting to conduct a work-related operation in an unsafe state. The tactile warning alerts the worker that the worker is at imminent risk of a fall. Such a warning may escalate and persist until the unsafe condition has been resolved.

Collectively, the edge computation modules 32-38 provide unique communications and computer power in the form factor of a new generation of compact, low cost, powerful, embedded processing engines that include hardware acceleration which is essential for modern AI. This includes Graphical Processor Units (GPUs) and Visual Processing Units (VPU) that can host complex software, such as Deep Learning Neural Networks (DLNN). This also includes a wide variety of communication mechanisms that come with the new generation of embedded computing (Blue Tooth, Wi-Fi, local adaptive mesh networks, etc.).

According to various aspects, the AI module 40 includes a plurality of AI modules which collectively include a fall prevention intelligence module/algorithm 42, a fall detection intelligence module/algorithm 44, and a fall mitigation intelligence module/algorithm 46.

The fall prevention intelligence module/algorithm 42 is communicably coupled to the processing circuit 26 and is configured to ensure that the full body harness 12 has been properly anchored to a suitable secure anchor location 16. For example, according to various aspects, the fall prevention intelligence module/algorithm 42 is configured to ensure the lanyard/D-ring connector 14 has been connected to a railing of the basket of the lift equipment. For such aspects, the fall prevention intelligence module/algorithm 42 may utilize information originated from one or more of the plurality of sensing devices (a direct detection of the connection) and/or from one or more of the plurality of AI modules (an inference of a state of the connection).

The fall detection intelligence module/algorithm 44 is communicably coupled to the processing circuit 26 and is configured to detect a worker fall which has a sufficient risk of injury or death associated therewith, and alert neighboring workers and/or company management to the fall. The fall detection intelligence module/algorithm 44 may utilize information originated from one or more of the plurality of sensing devices 50 and/or from one or more of the plurality of AI modules 40 (e.g., an elevation of the basket/platform). The fall detection intelligence module/algorithm 44 may determine a worker fall is beyond a user-defined safety threshold, and determine the severity of the fall with respect to acceleration, deceleration and impact measurements.

The fall mitigation intelligence module/algorithm 46 is communicably coupled to the processing circuit 26 and is configured to reason about various parameters (e.g., the lift motion, the state of the D-ring connector, etc.) and flag conditions which are unsafe for continued operations by the lift passenger. The fall mitigation intelligence module/algorithm 46 includes a powerful reasoning algorithm that encodes context of the current operation (e.g., whether the worker working from a lift or from an elevated platform) and categorizes the fall risk according to established safety parameters. Drawing support from edge computing resources and additional sensors, the fall mitigation intelligence module/algorithm 46 is configured to examine the context of the current work scenario by adapting its internal algorithms to the specifics of that scenario, including the planned work, to ensure worker safety beyond anchorage and connectors. For example, according to various aspects, the fall mitigation intelligence module/algorithm 46 is configured to address no go areas for a lift and/or monitor worker proximity to an established safety barrier when the worker is positioned on an elevated platform (e.g., in the bucket of an aerial lift).

The modules/algorithms 32-38 and 42-46 of the fall protection apparatus 18 work diligently in unison to allow the fall protection apparatus 18 to bring active safety measures which ensure the components of the ABCD fall arrest system guidelines are met. The modules/algorithms may be implemented in hardware, firmware, software (algorithms) and in any combination thereof. Software aspects may utilize any suitable computer language (e.g., C, C++, Java, JavaScript, Python, etc.) and may be embodied permanently or temporarily in any type of machine, component, physical or virtual equipment, storage medium, or propagated signal capable of delivering instructions to a device. The modules may be stored on a computer-readable medium (e.g., disk, device, and/or propagated signal) such that when a computing device reads the medium, the functions described herein are performed. The above-described functionality of the modules/algorithms may be combined into fewer modules, distributed differently amongst the modules, spread over additional modules, etc.

According to various aspects, the sensing device 50 includes a plurality of sensing devices which collectively include an inertial sensing device 52 and a microbolometer 54. The inertial sensing device 52 is electrically coupled to the edge computing device 22, and may be a micro-electro-mechanical system (MEMS) inertial measurement unit configured to detect, for example, a state of a connection between the lanyard/D-ring connector 14 and the lift platform railing (the secure anchor location 16) of the lift device. Due to the application, the inertial sensing device 52 may be referred to as a D-ring sensor.

According to various aspects, the microbolometer 54 is electrically coupled to the edge computing device 22, and is configured to detect general motion of the lift, including but not limited to signed vertical motion. According to various aspects, the microbolometer 54 is further configured to a measure a specific force, angular rate and/or orientation of the worker or the boom/basket of the lift equipment relative to the ground. According to other aspects, the microbolometer 54 is configured to operate as an imaging device, even in the absence of light.

The plurality of sensing devices 50 may also include one or more tactile sensors 56 and a camera 58 as shown in FIG. 9. The plurality of sensing devices may also include one or more motion sensors (e.g., one or more sensors configured to measure relative vertical motion, one or more sensors configured to detect orientation of the fall protection apparatus 18 with respect to gravity, etc.). According to various aspects, the plurality of sensing devices can include a sensor as simple as a thermistor, and/or a sensor as complex as an event-based camera, light detection and ranging such as flash lidar, and/or a high definition (HD) camera or the like.

According to various aspects, one or more of the parameters measured by the sensing devices 50 may be utilized to help detect a condition where the lift is in motion and that motion exceeds a threshold for an elevation which mandates fall protection. At a minimum, the fall protection apparatus 18 measures and records the vertical motion of the lift, and by extension, the bucket/platform. Once the vertical motion of the lift/bucket/platform exceeds predetermined critical safety thresholds encoded in the fall protection apparatus 18 (the safety standards may be set to always be equal to or greater than OSHA mandates), the conditions for active mitigation for fall risk are primed. The core components of the fall protection apparatus 18 work in concert to deliver the above-described functionalities in a compact and cost-effective format which addresses needs of the construction/lift industry.

In addition to the above described functionalities, the fall protection apparatus 18 may further include electronic diagnostics which monitor the state of the fall protection apparatus 18 to provide visual and/or audible indications that the fall protection apparatus 18 is operating properly, as well as providing visual and/or audible indications of the remaining capacity/life of the power source 24. Furthermore, although not shown for purposes of simplicity, according to various aspects, the fall protection apparatus 18 may interface with the control system of the lifting device in order to prevent potentially unsafe lift operations. For such instances, the fall protection apparatus 18 may communicate control signals to the control system of the lifting device, and such control signals may cause the lifting device to stop a current trajectory (e.g., stop the basket/platform from moving vertically and/or extending horizontally), reverse the current trajectory, etc.

Figure 10:
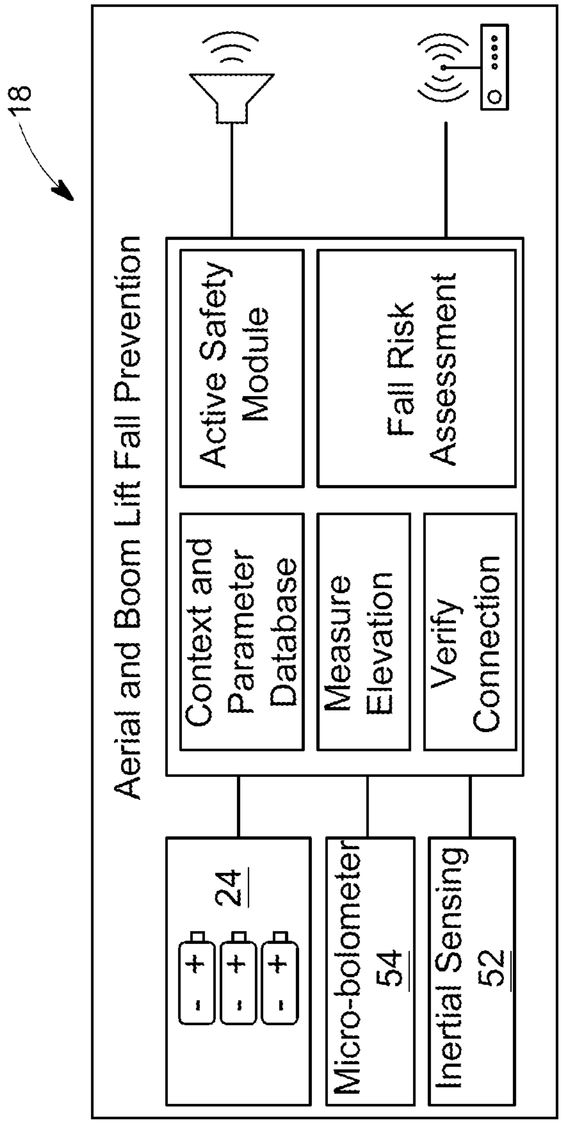
FIG. 10 illustrates a system level representation of the fall protection apparatus of FIG. 8, in accordance with at least one aspect of the present disclosure.

FIG. 10 illustrates a system level representation of the fall protection apparatus 18, in accordance with at least one aspect of the present disclosure. In the context of the fall protection apparatus 18 being configured/utilized to prevent worker falls from aerial lifts and boom/bucket type lifts, the active safety components of the fall protection apparatus 18 are able to measure the motion of the lift device and simultaneously monitor the connection between the lanyard/D-ring connector 14 to the lift platform railing (the secure anchor location 16) of the lift device. As shown in FIG. 10, the microbolometer 54 may be utilized to measure a vertical component (elevation) of the motion and the inertial sensing device 52 may be utilized to verify the connection between the lanyard/D-ring connector 14 and the lift platform railing (the secure anchor location 16) is confirmed. For this basic example, the conditions for active safety intervention, i.e., a warning or mitigation, are twofold. First, the lift/boom exceeds a predetermined motion threshold. In this case, the height of the basket above the ground is such that the risk of death or injury from the fall is significant. Second, the inertial sensing device 52 indicates that (a) the lanyard/D-ring connector 14 is properly anchored (direct monitoring of the connection between the lanyard/D-ring connector 14 and the lift platform railing (the secure anchor location 16), or (b) the data from the inertial sensing device 52 indicates conditions that are necessary for the lanyard/D-ring connector 14 to be connected (indirect monitoring of the connection).

While the measurement of lift motion is a relatively straightforward concept, the monitoring of the connection/anchorage is more difficult. As set forth above, the fall protection apparatus 18 may utilize two different approaches to monitoring the connection/anchorage: direct and indirect. The two approaches differ mainly in the cost and complexity of the implementation and less so in the capabilities. Whereas the direct approach utilizes the inertial sensing device 52 to determine the connection/anchorage is proper, the indirect approach relies on the fall prevention intelligence module/algorithm 42 to make an inference that the connection/anchorage is proper.

In at least one aspect, the fall protection apparatus 18 is configured to measure relative vertical motion utilizing a combination of Inertial Navigation System (INS) data and elevation data. With respect to verification of the connection/anchorage indirectly, according to various aspects, the fall protection apparatus 18 may monitor the position of the lanyard/D-ring connector 14 with respect to a gravity vector.

Figure 12:
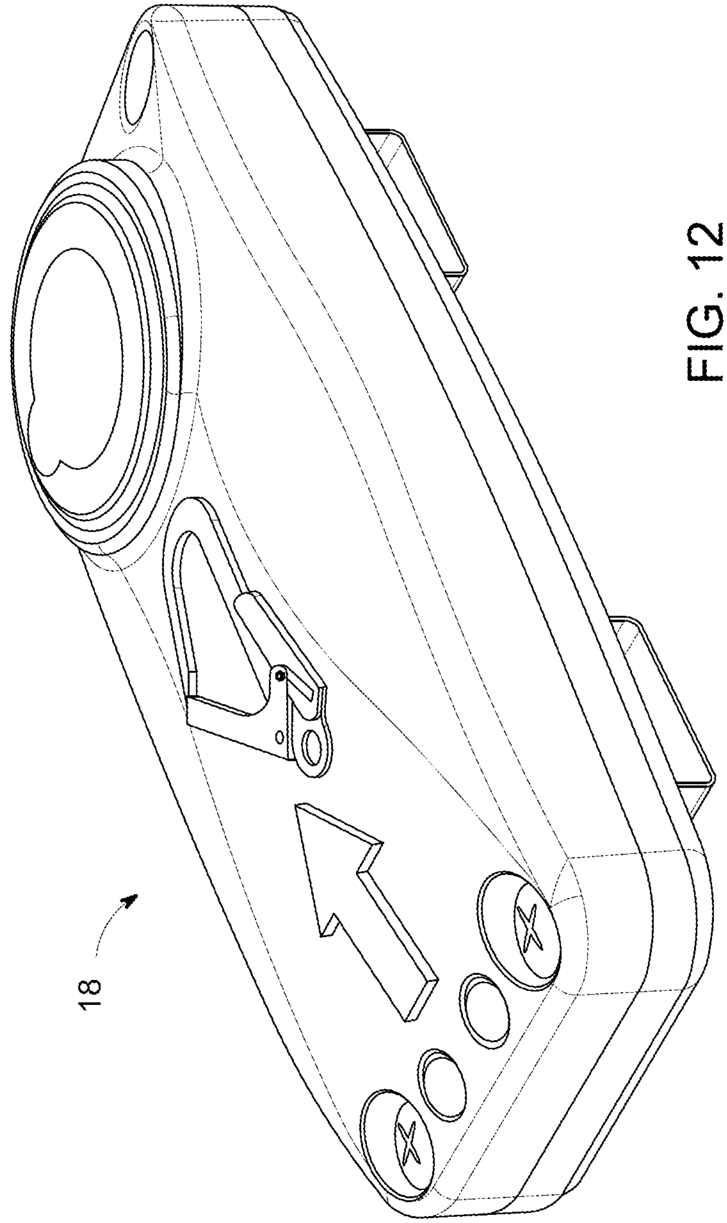
FIG. 12 illustrates the fall protection apparatus of FIG. 8, in accordance with at least one other aspect of the present disclosure.

This level of absolute orientation monitoring is possible since the fall protection apparatus 18 is physically and rigidly mounted to the lanyard/D-ring connector 14 in a known geometric configuration, which may be depicted graphically on the fall protection apparatus 18 (See FIG. 12). The inertial measurement system within the fall protection apparatus 18 constantly monitors the orientation of the fall protection apparatus 18 with respect to gravity. The condition for verifying the connection/anchorage is that the orientation of the lanyard/D-ring connector 14 is roughly vertical over a time integral. By integrating this over time, it smooths out false alarms and improves accuracy of the fall protection apparatus 18.

It is important to remember that this condition, even when satisfied, doesn't indicate that the lanyard/D-ring connector 14 is connected to the secure anchor location 16. Rather, it provides a partial and indirect indicator of a condition typical of connection/anchorage but not a guarantee of connection/anchorage. It protects the user from the most common form of fall protection failure, which is simply leaving the lanyard/D-ring connector 14 to hang from the full body harness 12 (a failure of both procedure and vigilance) unconnected to the secure anchor location 16. When this condition is noticed and the fall protection apparatus 18 is above a certain height threshold, an audible warning will be provided to remind the worker to attach the lanyard/D-ring connector 14 to the secure anchor location 16. This warning will continue until the condition is resolved.

Figure 11:
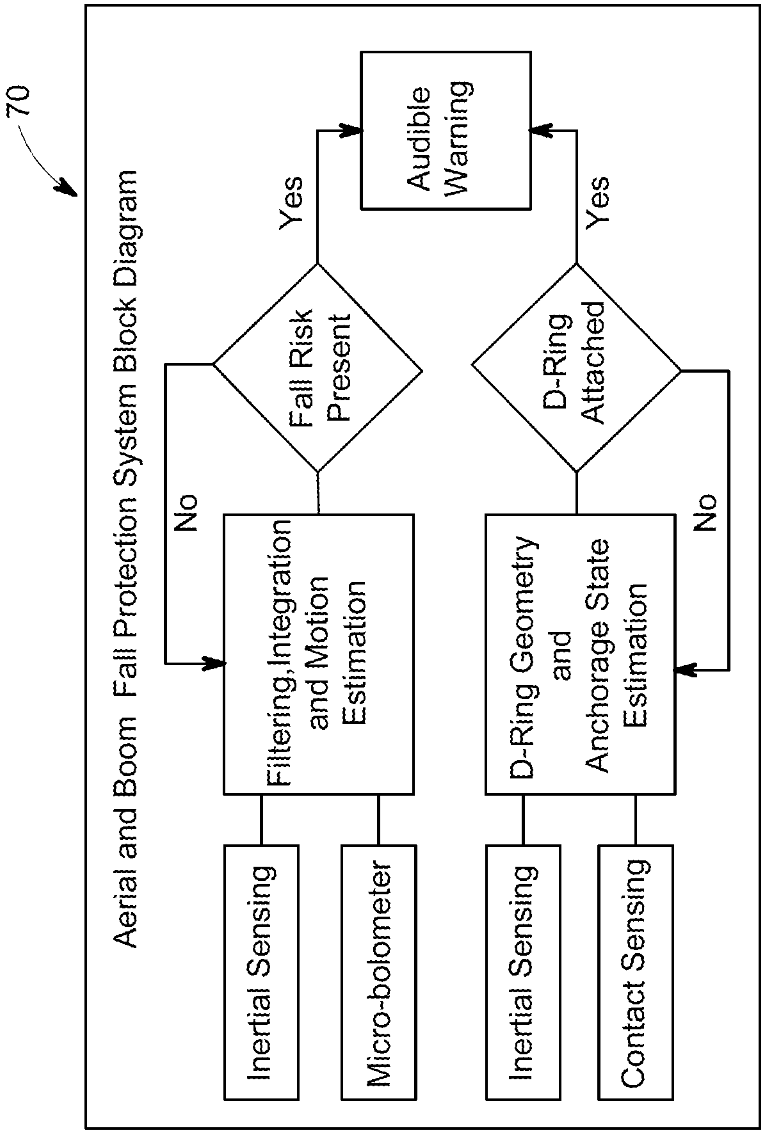
FIG. 11 illustrates a method of operation of the fall protection apparatus of FIG. 8 at a functional level, in accordance with at least aspect of the present disclosure.

FIG. 11 illustrates a method 70 of operation of the fall protection apparatus 18 at a functional level, in accordance with at least aspect of the present disclosure. For this aspect, the fall protection apparatus 18 monitors both the lift motion of the lifting device and the orientation of the lanyard/D-ring connector 14 with respect to a gravity vector. It will be appreciated more capable aspects of the fall protection apparatus 18 are available. For example, for one aspect of the fall protection apparatus 18, the connection between the lanyard/D-ring connector 14 and the secure anchor location 16 is directly verified by contact sensing or other means. This is a stronger form of protection which measures the lift motion, the orientation of the fall protection apparatus 18, and verifies that some form of contact on the inside of the snap hook of the lanyard/D-ring connector 14 has been made.

Although this aspect provides enhanced protection, the alarm functionality of the fall protection apparatus 18 can be defeated, either intentionally or unintentionally, by a worker mounting the fall protection apparatus 18 on his/her person in an orientation which mimics the proper positioning of the fall protection apparatus 18 relative to the lanyard/D-ring connector 14, and in such a manner that the contact sensing is triggered. For example, just connecting the lanyard/D-ring connector 14 to a belt loop of the worker's pants would satisfy these two constraints.

According to at least one other aspect, the fall protection apparatus 18 is configured to verify that the lanyard/D-ring connector 14 is connected to a ferrous metal of sufficient mass to qualify as a secure anchor location 16. In another aspect, the fall protection apparatus 18 includes a camera-based system which monitors the situation and ensures that the lanyard/D-ring connector 14 is properly connected to a secure anchor location 16.

FIG. 12 illustrates the fall protection apparatus 18, in accordance with at least one other aspect of the present disclosure. According to various aspects, the fall protection apparatus 18 is secured directly to the lanyard 14 using two hook & loop cinch straps. As shown in FIG. 12, the fall protection apparatus 18 may be marked or labeled pictorially in a manner that guides a user to orient the fall protection apparatus 18 correctly when securing the fall protection apparatus 18 on the lanyard 14. As described hereinabove, the fall protection apparatus 18 includes one or more sensors configured to detect the orientation of the fall protection apparatus 18 with respect to gravity. When the fall protection apparatus 18 is attached/connected/affixed to the end of the lanyard 14 proximate the secure anchor location 16 (the end of the lanyard 14 opposite the full body harness 12 worn by the worker), the one or more sensors detect/monitor the position/orientation of the fall protection apparatus 18 with respect to gravity, thereby providing an indication of whether or not the lanyard 14 is connected to the secure anchor location 16.

According to some non-limiting aspects, a plurality of fall protection apparatuses 18 can be implemented. For example, a first fall protection apparatus 18 can be selectively attached to the secure anchor point or the harness and a second fall protection apparatus 18 can be selectively attached to the connector, or D-ring. As such, the sensing devices 50 on each of the first and second fall protection apparatus 18 can work in concert, detecting their relative proximity to one another. According to such non-limiting aspects, the processing circuit 26 can determine whether the connector is attached to the secure anchor point, the harness, or any other point based on a user-defined parameter, such as a desired proximity between any number of fall protection apparatuses 18 (e.g., based on the length of the lanyard, for example). This can prevent a fall protection apparatus 18 from errantly determining that the connector is properly connected if it is attached to anything other than the secure anchor point.

Figure 13:
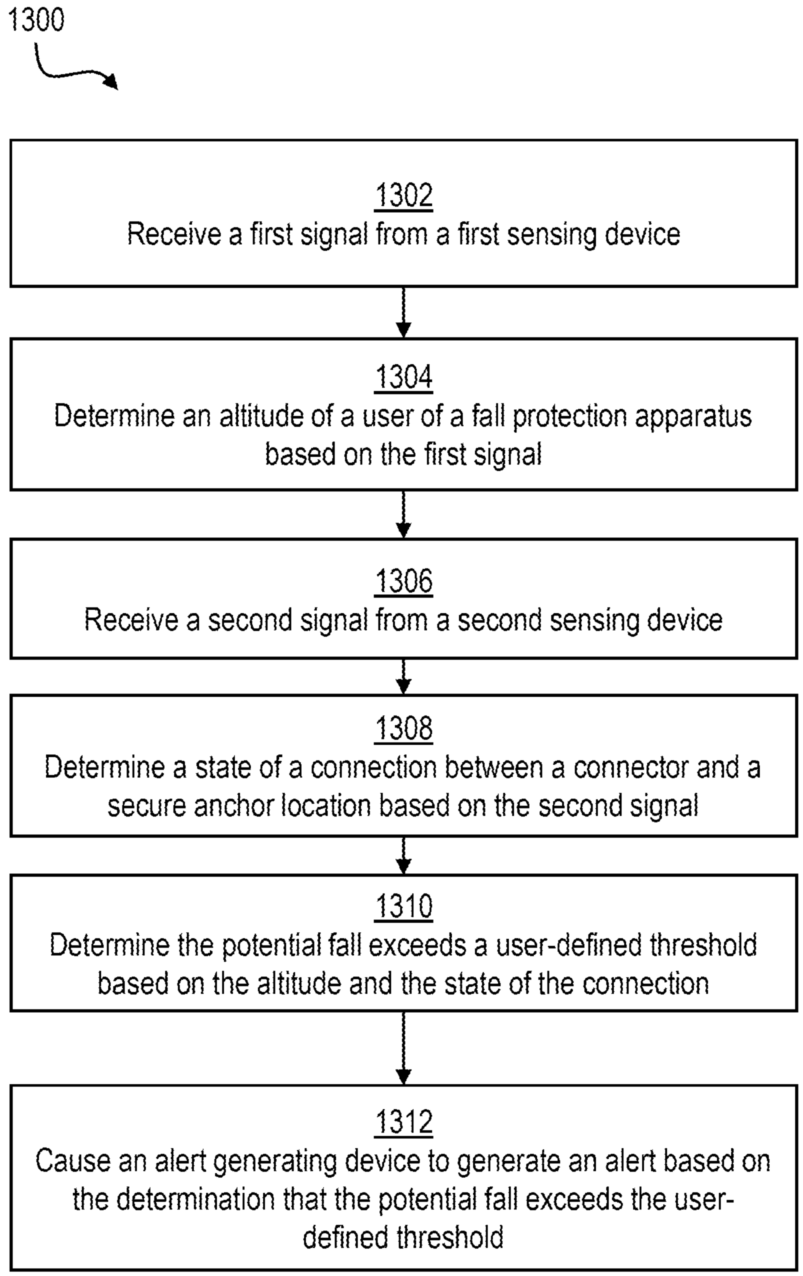
FIG. 13 illustrates a logic flow diagram of a method of mitigating a risk of a potential fall, in accordance with at least one non-limiting aspect of the present disclosure.

FIG. 13 illustrates a logic flow diagram of a method 1300 of mitigating a risk of a potential fall in accordance with at least one non-limiting aspect of the present disclosure. For example, the method 1300 can be performed via the processing circuit 26 of the fall protection apparatus 18 of FIG. 8, upon execution of the fall-protection algorithm stored in the memory circuit 28. According to the non-limiting aspect of FIG. 13, the method 1300 can include receiving 1302 a first signal from a first sensing device and determining 1302 a first parameter of a potential fall based on the first signal. For example, according to the non-limiting aspect of FIG. 13, the first sensing device can include a microbolometer and the first parameter can include an altitude of a user of a fall protection apparatus. The method 1300 can include receiving 1306 a second signal from a second sensing device and determining 1308 a second parameter of a potential fall based on the second signal. For example, according to the non-limiting aspect of FIG. 13, the second sensing device can include an inertial measurement unit and/or gyroscope and the second parameter can include a state of a connection between a connector and a secure anchor location.

Still referring to FIG. 13, the method 1300 can further include determining 1310 that the potential fall exceeds a user-defined threshold. For example, the determined altitude of the user of the fall protection apparatus may exceed a user-defined altitude beyond which the state of the connector should be monitored. Additionally or alternately, the state of the connection between a connector and a secure anchor location (e.g., position, orientation, etc.) could deviate from a user-defined state of the connection between a connector and a secure anchor location, indicating that the connector is not connected, or not properly connected. Accordingly, the method 1300 can include causing 1312 an alert generating device to generate an alert based on the determination that the potential fall exceeds the user-defined threshold.

Examples of the method according to various aspects of the present disclosure are provided below in the following numbered clauses. An aspect of the method may include any one or more than one, and any combination of, the numbered clauses described below.

Clause 1. A fall protection apparatus, including a sensing device, an alert generating device, a processing circuit communicably coupled to the sensing device and the alert generating device, and a memory communicably coupled to the processing circuit, wherein the memory is to store a fall-detection intelligence algorithm that, when executed by the processing circuit, causes the processing circuit to receive a signal from the sensing device, determine a parameter associated with a potential fall based on the signal, determine the parameter exceeds a user-defined threshold based on the parameter, and cause the alert generating device to generate an alert based on the determination that the parameter exceeds the user-defined threshold.

Clause 2. The fall protection apparatus according to clause 1, wherein the parameter includes an altitude of a user of the fall protection apparatus.

Clause 3. The fall protection apparatus according to either of clauses 1 or 2, wherein the parameter further includes a state of a connection between a connector a secure anchor location.

Clause 4. The fall protection apparatus according to any of clauses 1-3, wherein the fall protection apparatus is selectively attachable to the connector.

Clause 5. The fall protection apparatus according to any of clauses 1-4, wherein the parameter associated with the potential fall further includes at least one of an acceleration, a deceleration, a force, an angular rate of motion, or an orientation, a motion, or combinations thereof.

Clause 6. The fall protection apparatus according to any of clauses 1-5, wherein the sensing device includes at least one of an inertial sensing device, a gyroscope, a microbolometer, or an imaging device, or combinations thereof.

Clause 7. The fall protection apparatus according to any of clauses 1-6, wherein the processing circuit is remotely located relative to the sensing device.

Clause 8. The fall protection apparatus according to any of clauses 1-7, wherein the processing circuit is an edge computing resource.

Clause 9. The fall protection apparatus according to any of clauses 1-8, wherein the edge computing resource is to provide the processing circuit with real-time information associated with a work scenario context, and wherein the determination that the parameter exceeds a user-defined threshold is further based on the real-time information provided by the edge computing resource.

Clause 10. The fall protection apparatus according to any of clauses 1-9, wherein the fall-detection intelligence algorithm, when executed by the processing circuit, further causes the processing circuit to receive the real-time information from the edge computing resource, determine the work scenario context based on the real-time information, and adapt an internal algorithm of the fall-detection intelligence algorithm based on the work scenario context.

Clause 11. The fall protection apparatus according to any of clauses 1-10, wherein the work scenario context includes at least one of a "no-go" area, an established safety barrier, or a proximity to the established safety barrier, or combinations thereof.

Clause 12. The fall protection apparatus according to any of clauses 1-11, wherein the edge computing resource includes at least one of a wireless communication module, an auditory module, or a tactile module, or combinations thereof.

Clause 13. The fall protection apparatus according to any of clauses 1-11, wherein the memory stores an artificial intelligence ("AI") module to continuously improve the determination that the parameter exceeds the user-defined threshold.

Clause 14. The fall protection apparatus according to any of clauses 1-13, wherein the alert is audible.

Clause 15. The fall protection apparatus according to any of clauses 1-14, wherein the alert is tactile.

Clause 16. A fall protection apparatus, including a processing circuit communicably coupled to a sensing device and an alert generating device, and a memory communicably coupled to the processing circuit, wherein the memory is to store a fall-detection intelligence algorithm that, when executed by the processing circuit, causes the processing circuit to receive a signal from the sensing device, determine a parameter associated with a potential fall based on the signal, determine the parameter exceeds a user-defined threshold based on the parameter, and cause the alert generating device to generate an alert based on the determination that the parameter exceeds the user-defined threshold.

Clause 17. The fall protection apparatus according to clause 16, wherein the parameter includes an altitude of a user of the fall protection apparatus.

Clause 18. The fall protection apparatus according to either of clauses 16 or 17, wherein the parameter further includes a state of a connection between a connector a secure anchor location.

Clause 19. A computer-implemented method of mitigating a risk of a potential fall, the method including receiving, via a processing circuit, a first signal from a first sensing device, determining, via the processing circuit, an altitude of a user of a fall protection apparatus based on the first signal, receiving, via a processing circuit, a second signal from a second sensing device, determining, via the processing circuit, a state of a connection between a connector and a secure anchor location based on the second signal, determining, via the processing circuit, the parameter exceeds a user-defined threshold based on the altitude of the user of the fall protection apparatus and the state of the connection between a connector and a secure anchor location, and causing, via the processing circuit, an alert generating device to generate an alert based on the determination that the parameter exceeds the user-defined threshold.

Clause 20. The computer-implemented method according to clause 19, further including receiving, via the processing circuit, real-time information associated with a work scenario context from an edge computing resource, determining, via the processing circuit, the work scenario context based on the real-time information, and adapting, via the processing circuit, a fall-detection intelligence algorithm executed by the processing circuit based on the work scenario context.

Although the various aspects of the fall protection apparatus, system and method have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of its use with aerial lifts and other boom/basket lifting devices, the general principles of the invention are equally applicable to other types of workplace environments (e.g., in an environment where a ladder is being used).

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A fall protection system, comprising:
- a sensing device;
- an alert generating device;
- a processing circuit communicably coupled to the sensing device and the alert generating device; and
- a memory communicably coupled to the processing circuit, wherein the memory is to store a fall-detection intelligence algorithm that, when executed by the processing circuit, causes the processing circuit to:
  - receive a signal from the sensing device;
  - determine an altitude of a user, wherein the altitude is associated with a potential fall distance based on the signal;
  - determine the altitude exceeds an encoded safety threshold based on the parameter; and
  - cause the alert generating device to generate an alert based on the determination that the altitude exceeds the encoded safety threshold.

2. The fall protection apparatus of claim 1, wherein the fall-detection intelligence algorithm, when executed by the processing circuit, further causes the processing circuit to:
- receive a second signal from a second sensing device;
- determine a condition of a connector, wherein the connector is configured to transition between an open condition and a closed condition;
- determine that the connector is in the open condition based on the second signal; and
- cause the alert generating device to generate an alert based on the determination that connector is in the open condition.

3. The fall protection apparatus of claim 2, wherein the fall protection apparatus is selectively attachable to the connector.

4. The fall protection apparatus of claim 2, wherein the fall-detection intelligence algorithm, when executed by the processing circuit, further causes the processing circuit to:

determine at least one of an acceleration, a deceleration, a force, an angular rate of motion, an orientation, and a motion, or combinations thereof based on the signal; and cause the alert generating device to generate an alert based on the determination of the at least one of an acceleration, a deceleration, a force, an angular rate of motion, an orientation, and a motion, or combinations thereof.

5. The fall protection apparatus of claim 1, wherein the sensing device comprises at least one of an inertial sensing device, a gyroscope, a microbolometer, or an imaging device, or combinations thereof.

6. The fall protection apparatus of claim 1, wherein the processing circuit is remotely located relative to the sensing device.

7. The fall protection apparatus of claim 1, wherein the processing circuit is an edge computing resource.

8. The fall protection apparatus of claim 7, wherein the edge computing resource is to provide real-time information associated with a work scenario context, and wherein the determination that the altitude exceeds a encoded safety threshold is further based on the real-time information provided by the edge computing resource.

9. The fall protection apparatus of claim 8, wherein the fall-detection intelligence algorithm, when executed by the processing circuit, further causes the processing circuit to:

receive the real-time information from the edge computing resource;

determine the work scenario context based on the real-time information; and adapt an internal algorithm of the fall-detection intelligence algorithm based on the work scenario context.

10. The fall protection apparatus of claim 9, wherein the work scenario context comprises at least one of a "no-go" area, an established safety barrier, or a proximity to the established safety barrier, or combinations thereof.

11. The fall protection apparatus of claim 9, wherein the edge computing resource comprises at least one of a wireless communication module, an auditory module, or a tactile module, or combinations thereof.

12. The fall protection apparatus of claim 1, wherein the memory stores an artificial intelligence ("AI") module to continuously improve the determination that the altitude exceeds the encoded safety threshold.

13. The fall protection apparatus of claim 1, wherein the alert is audible.

14. The fall protection apparatus of claim 1, wherein the alert is tactile.

15. The fall protection system of claim 1, wherein the fall protection system comprises a body harness.

16. A fall protection apparatus, comprising:

a processing circuit communicably coupled to a sensing device and an alert generating device; and a memory communicably coupled to the processing circuit, wherein the memory is to store a fall-detection intelligence algorithm that, when executed by the processing circuit, causes the processing circuit to:

receive a signal from the sensing device;

determine an altitude of a user, wherein the altitude is associated with a potential fall distance based on the signal;

determine the altitude exceeds an encoded safety threshold; and cause the alert generating device to generate an alert based on the determination that the altitude exceeds the encoded safety threshold.

17. The fall protection apparatus of claim 16, wherein the fall-detection intelligence algorithm, when executed by the processing circuit, further causes the processing circuit to:

receive a second signal from a second sensing device;

determine a condition of a connector, wherein the connector is configured to transition between an open condition and a closed condition;

determine that the connector is in the open condition based on the second signal; and cause the alert generating device to generate an alert based on the determination that connector is in the open condition.

18. A computer-implemented method of mitigating a risk of a potential fall, the method comprising:

receiving, via a processing circuit, a first signal from a first sensing device;

determining, via the processing circuit, an altitude of a user of a fall protection apparatus based on the first signal;

receiving, via a processing circuit, a second signal from a second sensing device;

determining, via the processing circuit, a state of a connection between a connector and a secure anchor location based on the second signal;

determining, via the processing circuit, the altitude exceeds an encoded safety threshold determining that the connector is in an open condition based on the second signal; and causing, via the processing circuit, an alert generating device to generate an alert based on the determination that the altitude exceeds the encoded safety threshold and based on the determination that the connector is in the open condition.

19. The computer-implemented method of claim 18, further comprising:

receiving, via the processing circuit, real-time information associated with a work scenario context from an edge computing resource;

determining, via the processing circuit, the work scenario context based on the real-time information; and adapting, via the processing circuit, a fall-detection intelligence algorithm executed by the processing circuit based on the work scenario context.

20. A fall protection system, comprising:

a sensing device;

an alert generating device;

a processing circuit communicably coupled to the sensing device and the alert generating device; and a memory communicably coupled to the processing circuit, wherein the memory is to store a fall-detection intelligence algorithm that, when executed by the processing circuit, causes the processing circuit to:

receive a signal from the sensing device;

determine an altitude of a user, wherein the altitude is associated with a potential fall distance based on the signal;

determine the altitude exceeds an encoded safety threshold;

receive a second signal from a second sensing device;

determine a condition of a connector, wherein the connector is configured to transition between an open condition and a closed condition;

determine that the connector is in the open condition based on the second signal; and cause the alert generating device to generate an alert based on the determination that the altitude exceeds the encoded safety threshold and based on the determination that the connector is in the open condition.

* * * * *